United States Patent [19]

Kawamoto et al.

[11] 4,367,528
[45] Jan. 4, 1983

[54] SHIFT CONTROL DEVICE FOR AN AUTOMATIC TRANSMISSION

[75] Inventors: Mutsumi Kawamoto; Nobuaki Miki, both of Nagoya, Japan

[73] Assignee: Aisin-Warner, Anjo, Japan

[21] Appl. No.: 72,935

[22] Filed: Sep. 6, 1979

[30] Foreign Application Priority Data

Sep. 30, 1978 [JP] Japan .................. 53/121102

[51] Int. Cl.³ .............. B60K 41/08; B60K 41/22; G06F 15/20
[52] U.S. Cl. .................. 364/424.1; 74/866; 180/70 R
[58] Field of Search .............. 364/431; 79/866; 180/70

[56] References Cited

U.S. PATENT DOCUMENTS

| 4,031,782 | 6/1977 | Miller et al. | 74/866 |
| 4,034,627 | 7/1977 | Mizote | 74/866 |
| 4,073,204 | 2/1978 | Dick | 74/866 |
| 4,155,277 | 5/1979 | Minami et al. | 74/866 |
| 4,198,882 | 4/1980 | Kiencke et al. | 74/866 |
| 4,220,059 | 9/1980 | Mizuno et al. | 74/866 X |
| 4,222,292 | 9/1980 | Will et al. | 74/866 |
| 4,224,842 | 9/1980 | Rabus et al. | 74/866 |

Primary Examiner—Felix D. Gruber
Attorney, Agent, or Firm—Cooper, Dunham, Clark, Griffin & Moran

[57] ABSTRACT

This unit is equipped with a solenoid valve which is installed in an oil passage and exhausts the oil pressure from the oil passage at an appointed time in accordance with the output of an electric control circuit, and with a shift transition control valve controlled by said solenoid having two independent oil chambers in which the oil pressures supplied to hydraulic servos in forward and reverse drives respectively are regulated. Shift valves are installed between the shift transition control valve and the hydraulic servos, and the oil pressure adjusted by the shift transition control valve is supplied to the appointed oil pressure servos through each shift valve from the start to the completion of a shift. When the shift is completed, the oil pressure supplied to the hydraulic servo is changed to line pressure. The timing function required for a clutch-to-clutch shift is controlled by a timing device composed of a pressure hold valve and a flow control valve.

7 Claims, 6 Drawing Figures

SHIFT CONTROL DEVICE FOR AN AUTOMATIC TRANSMISSION

BACKGROUND OF THE INVENTION

1. Field of the Invention:

The present invention relates to a shift control device for an automatic transmission for automobiles where an electric control system is used and, more particularly, a shift control device for an automatic transmission whereby good timing of hydraulic servo operations during shifting is obtained, and undesirable shocks during shifting is prevented.

2. Description of the Prior Art:

In an automatic transmission with a torque converter, the hydraulic pressure is adjusted in accordance with each gear stage by installing a variety of valves on a hydraulic circuit while the hydraulic pressure is also modulated in accordance with the car speed and throttle opening to control the shock during shifts. An accumulator is also provided for the purpose of adjusting the oil pressure during the transition stage from the start to the completion of the shift. However, since the pressure schedule controlled by the accumulator is limited, the optimum hydraulic adjustment is not obtained to prevent shocks throughout the operating range. Further, a controller equipped with a number of accumulators and valves makes the hydraulic circuit complicated. On this account, as disclosed in U.S. Pat. No. 4,031,782 and the like, a controller for an automatic transmission equipped with an electronic control system as a shock control device has been provided. Said shock control device simplifies the hydraulic circuit by detecting electrically car speed, change in the torque of an output shaft and so on, and performs hydraulic adjustment by opening and closing of a solenoid valve installed at the appointed location of a hydraulic circuit. However, in the controller for an automatic transmission with said shock control device disclosed in the prior art, no consideration or countermeasure has been provided in case of a malfunction generated in the hydraulic circuit due to valve sticking and so on. In addition to this, the controller of the prior art was made complicated by the use of multiple solenoid valves for adjusting oil pressure as required during the N-D shift performed manually, and during the 1-2 shift, 2-3 shift, and 3-4 shift performed automatically, for example, in a 4-speed automatic transmission. A timing and oil pressure control were further required to control proper timing for a clutch-to-clutch shift without the invervention of a one way clutch in order to prevent undesirable shift shock. The timing valve was, however, insufficient in this timing function for shock prevention especially at low-speed shift or power-off shift.

SUMMARY OF THE INVENTION

An object of the present invention is to provide a controller for an automatic transmission with a shock control device which provides against malfunction due to valve sticking. A further object of the present invention is to provide a controller for an automatic transmission in which oil pressure supplied to hydraulic servos in all shifts is adjusted with a solenoid valve provided for oil pressure control, thus simplifying the hydraulic and electric control circuits.

A further object of the present invention is to provide a controller for an automatic transmission in which the timing of operation of hydraulic servos during shifting can be properly adjusted, engaging of gears is smooth, and undesirable shift shock and noises during light throttle or power-off shifts are prevented.

DESCRIPTION OF THE PREFERRED EMBODIMENT

Figure 1:
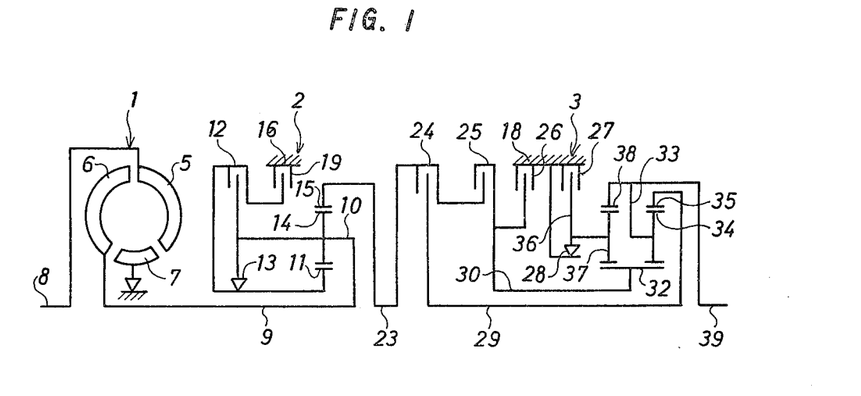
FIG. 1 is a skeleton diagram of the automatic transmission having four forward drives and one rearward drive controlled by the controller of the present invention.

FIG. 1 is a skeleton diagram of an automatic hydraulic transmission having four forward drives and one reverse drive including an overdrive device.

This automatic transmission is equipped with a torque converter 1, an overdrive mechanism 2 and a speed change gear mechanism 3 providing three forward drives and one reverse drive. The automatic transmission is designed to be controlled by the oil pressure controller shown in FIG. 2. The torque convertor 1 is of a well known variety and includes a pump 5, a turbine 6 and a stator 7. The pump 5 is connected to a crankshaft 8 of an engine and the turbine 6 is connected to a turbine shaft 9. The turbine shaft 9 serves as an output shaft, and also as an input shaft for the overdrive mechanism 2, and is connected to a carrier 10 of a planetary gear set. A planetary pinion 14 held by a carrier 10 is engaged with a sun gear 11 and a ring gear 15.

A multiple-disc clutch 12 and a one-way clutch 13 are installed between the sun gear 11 and the carrier 10, and moreover, a multiple-disc brake 19 is installed between the sun gear 11 and a housing or overdrive case 16 including the overdrive mechanism 2.

A ring gear 15 of the overdrive mechanism 2 is connected to an input shaft 23 of the speed change gear mechanism 3. A multiple disc clutch 24 is installed between the input shaft 23 and an intermediate shaft 29. In addition to this, a multiple disc clutch 25 is installed between the input shaft 23 and a sun gear shaft 30. A multiple disc brake 26 is installed between the sun gear shaft and a transmission case 18. A sun gear 32 installed on a sun gear shaft 30 serves two planetary gear sets, the first of which is composed of a carrier 33, a planetary pinion 34 held by said carrier and a ring gear 35 engaging said pinion, and the second of which is composed of another carrier 36, a planetary pinion 37, and a ring gear 38 engaging said pinion. A ring gear 35 at the first planetary gear set is connected with an intermediate shaft 29. In addition to this, the carrier 33 at this planetary gear set is connected with a ring gear 38 at the other planetary gear set, and this carrier and ring gear are connected with an output shaft 39. Also, a multiple disc brake 27 and a one-way clutch 28 are installed between a carrier 36 of the second planetary gear set and a transmission case 18.

This automatic transmission with an overdrive device is constructed so that engagement or disengagement of each clutch and brake is performed by the oil pressure controller described in detail hereinbelow in accordance with engine output and vehicle speed. Thus, the oil pressure controller automatically controls shifting in the forward speed stages including the overdrive stage (O/D) and, when manually selected, shifting into the rearward drive stage.

Table I shows shift position and the operating conditions of the clutches and brakes.

TABLE I

| Shift position | | Friction engaging unit | | | | | | |
|---|---|---|---|---|---|---|---|---|
| | | Clutch 12 | Clutch 24 | Clutch 25 | Brake 19 | Brake 26 | Brake 27 | One-way Clutch 13 | One-way Clutch 28 |
| Parking (P) | | O | X | X | X | X | O | | |
| Reverse (R) | | O | X | O | X | X | O | Lock | Lock |
| Neutral (N) | | O | X | X | X | X | X | | |
| FORWARD | | | | | | | | | |
| D | 1st | O | O | X | X | X | X | Lock | Lock |
| Range | 2nd | O | O | X | X | O | X | Lock | Overrun |
| | 3rd | O | O | O | X | X | X | Lock | Overrun |
| | O.D. | X | O | O | O | X | X | Overrun | Overrun |
| 3 | 1st | O | O | X | X | X | X | Lock | Lock |
| Range | 2nd | O | O | X | X | O | X | Lock | Overrun |
| | 3rd | O | O | O | X | X | X | Lock | Overrun |
| 2 | 1st | O | O | X | X | X | X | Lock | Lock |
| Range | 2nd | O | O | X | X | O | X | Lock | Overrun |
| L Range | | O | O | X | X | X | O | Lock | Lock |

In Table I, "O" shows that the clutch or brake is engaged and "X" shows that it is disengaged.

Figure 2:
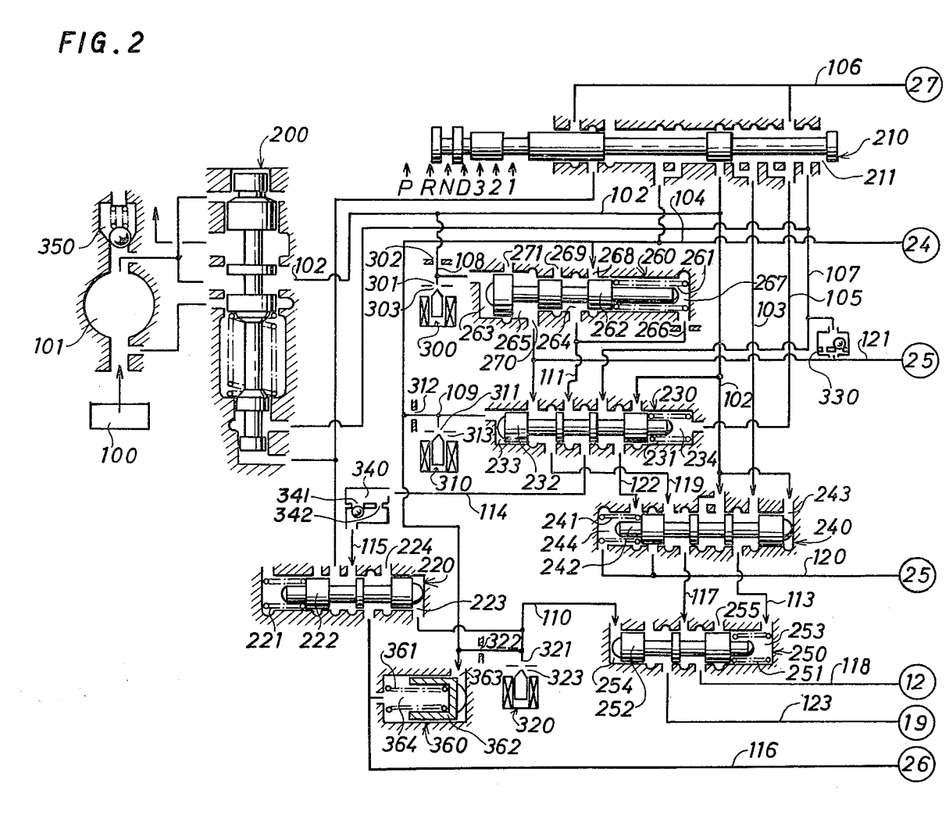
FIG. 2 is a preferred embodiment of an oil pressure circuit diagram for a hydraulic controller for the automatic transmission of the present invention.

FIG. 2 is a diagram showing one embodiment of the oil pressure circuit included in the oil pressure controller where the clutches and brakes 12, 19, 24, 25, 26 and 27 of the above-mentioned automatic transmission are operated selectively. At the same time, automatic or manual pressure regulation at speed change (referred to as "shift" hereinafter) is operated by the controller of this invention.

This oil pressure control circuit is composed of an oil reservoir 100, an oil pump 101, a pressure regulating valve 200, a manual shift valve 210, a 1-2 shift valve 220, a 2-3 shift valve 230, a 2-3 shift auxiliary valve 240, a 3-4 shift valve 250, a shift transition control valve 260, a pressure regulating solenoid valve 320, a flow control valve 330, a relief valve 350, pressure hold valve 360, flow control valve 340, and oil passages connecting the various valves.

The oil pumped by the oil pump 101 from the oil reservoir is fed to the oil passage 102 and is regulated by the pressure regulating valve 200 to maintain the appointed line pressure.

The manual shift valve 210 is connected to a shift lever installed at the driver's seat and the speed change gear mechanism is shifted by the manual operation of the valve 210 to each position of P,R,N,D, 3, 2, L in accordance with the range of the shift lever.

When a shift lever is at the position N, oil passage 102 is closed, and only the clutch 12 is engaged. When a shift lever is at the position D, the oil passage 102 is connected to an oil passage 104; when the shift lever is at the positions of 3 and 2, the oil passage 102 is connected to the oil passages 103 and 104; when the shift lever is at the position L, the oil passage 102 is connected to the oil passages 103, 104, 105, and 106; when the shift lever is at the position R, the oil passage 102 is connected to the oil passages 103, 105, 106 and 107.

Figure 4:
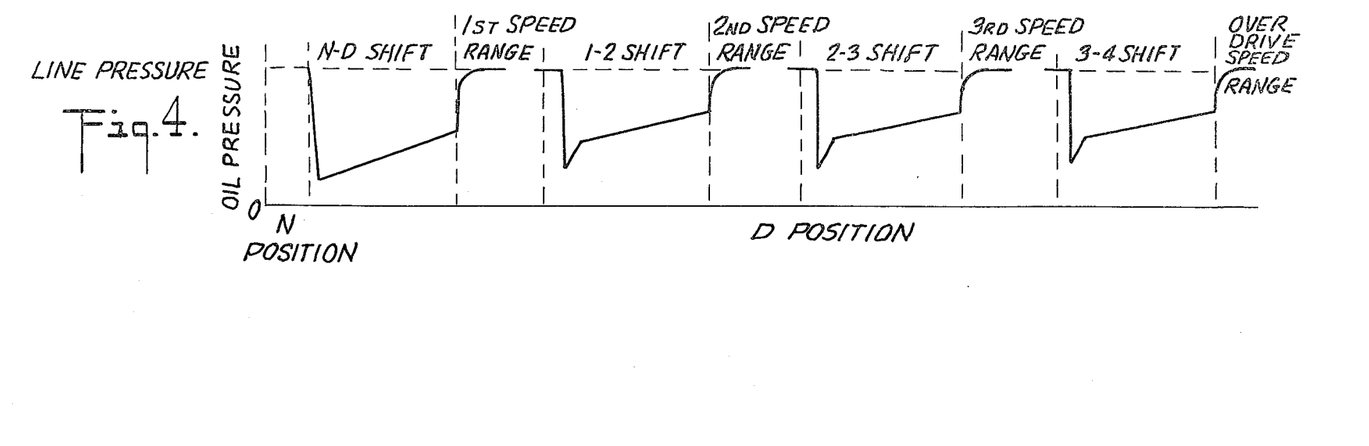
FIG. 4 is a wave form diagram of output oil pressure of a valve which prevents against shock.

A pressure regulating solenoid valve 300 performs the operation of make-and-break at the appointed time in accordance with pulse-shaped output signals at an electric control circuit described below; when power to the solenoid valve 300 is disconnected, oil pressure is allowed to generate in an oil passage 108 connected through an orifice 302 from the oil passage 102 by closing a hole 301; when the valve 300 is energized, the oil pressure changes as shown in FIG. 4 during shifting by exhausting the oil pressure in an oil passage 108 through an oil exhaust port 303 by opening the hole 301.

When power to the 2-3 speed shift solenoid valve 310 is disconnected, oil pressure is allowed to generate at an oil passage 109 connected through an orifice 312 from the oil passage 104 by closing a hole 311; when the solenoid valve 310 is energized, oil pressure in an oil passage 109 is exhausted through an oil exhaust port 313 by opening the hole 311.

When power to the 1-2 speed shift and 3-4 speed shift solenoid valve 320 is disconnected, oil pressure is allowed to generate in an oil passage 110 connected through an orifice 322 from the oil passage 104 by closing a hole 321; when the solenoid valve 320 is energized, oil pressure in the oil passage 110 is exhausted through the exhaust port 323 by opening the hole 321.

Table II shows the relation between the energized or deenergized states of solenoid valves 310 and 320 and the respective shift condition.

TABLE II

| SHIFT Position | N | 1 | 2 | 3 | 4 |
|---|---|---|---|---|---|
| Solenoid valve 310 | X | O | O | X | X |
| Solenoid valve 320 | X | O | X | O | X |

A shift transition control valve 260 has a spool 262 behind which a spring 2261 is installed on one side, a hydraulic oil chamber 263 connected to an oil passage 108, the first oil pressure regulating chamber 264, the second oil pressure regulating chamber 265, and the second hydraulic oil chamber 267 where the oil pressure from the first oil pressure regulating chamber 264 is fed back through an orifice 266. The function of valve 260 is to change the oil pressure pattern generated in the hydraulic oil chamber 263 connected with the above-mentioned oil passage 108 during shifting. The position of the spool 262 changes in response to the oil pressure in said hydraulic oil chamber 263, the oil pressure in the second hydraulic oil chamber 267 and the elastic force of a spring 261. In the forward drive, the valve 260 adjusts the opening area of an oil supply port 268 connected to an oil passage 104 and an oil exhaust port and thereby adjusts the oil pressure in an oil pressure 111 through the first oil pressure regulating chamber 264. In the rearward drive, the valve 260 adjusts the opening area of an oil supply port from an oil passage 121 connected to an oil passage 107 through a flow control valve 330 and an oil exhaust port 271 and thereby adjusts the oil pressure in the oil passage 121 through the second oil pressure regulating chamber 265. Thus, the valve 260 controls the engagement of a clutch 25 which prevents shocks during shifting.

In addition to this, the second hydraulic oil chamber 267 is not necessarily indispensable to the present invention; but the regulating oil pressure pattern at the forward drive and the shocks during shifting can be more positively controlled by feeding back the oil pressure generated in the first pressure regulating chamber 264 to the chamber 267 to control the position of spool 260.

A 2-3 speed shift valve 230 has a spool 232 behind which a spring 231 is installed on one side; at the first speed and the second speed, as a solenoid valve 310 is energized and oil pressure is not generated in an oil passage 109, a spool 232 is set to the left side by spring 231 shown in the figure; at the third speed and the fourth speed, the solenoid valve 310 is deenergized, oil pressure is generated in the oil passage 109 and an oil chamber 233, and the spool 232 is set to the right side shown in the figure.

A 1-2 speed shift valve 220 has a spool 222 behind which a spring 221 is installed on one side; at the first speed and the third speed, a solenoid valve 320 is energized and oil pressure is not generated in an oil passage 110, so that a spool 222 is set to the right side by spring 221 shown in the figure; at the second speed and the fourth speed, the solenoid valve 320 is deenergized, oil pressure is generated in the oil passage 110 and an oil chamber 223, and the spool 222 is set to the left side shown in the figure.

A 2-3 speed shift auxiliary valve 240 has a spool 242 behind which a spring 241 is installed; at the first speed and the second speed, oil pressure in an oil passage 102 is supplied to an oil chamber 243, and the spool 242 is set to the left side shown in the figure; at the third speed and the fourth speed, the oil pressure in an oil passage 122 connected with the oil passage 102 enters an oil chamber 244 and the spool 242 is fixed to the right side shown in the figure.

A 3-4 speed shift valve 250 has a spool 252 behind which a spring 251 is installed; at the first speed and the second speed, oil pressure is supplied to an oil chamber 253 from an oil passage 113 connected with the oil passage 102 and the spool 252 is fixed to the left side shown in the figure; at the third speed, the oil passage 103 is connected with an oil passage 113 by the travelling of the spool 242 of the 2-3 speed shift auxiliary valve 240, and if a manual valve 210 is at the position D, the oil pressure of an oil chamber 253 is exhusted; at the fourth speed, the solenoid valve 320 is deenergized, oil pressure is generated in the oil passage 110 and an oil chamber 254, and the spool 252 is set to the right side shown in the figure.

A pressure hold valve 360 has a spool 362 behind which a spring 361 is installed on one side, and is equipped with an oil pressure accumulating chamber 364 connected to an oil passage 116 connecting with a 1-2 speed shift valve 220 and a brake 26, and with an oil chamber 363 connected with an oil passage 104.

A flow control valve 340 is equipped with an orifice 341 with a check valve and a small orifice 342. Flow control valve 340 is connected with the 2-3 speed shift valve 230 through an oil passage 114 and is connected with the 1-2 shift valve 220 through an oil passage 115.

The operation of the above-mentioned oil pressure circuit shall be described as follows.

When position N is selected for manual valve 210, solenoid valves 300, 310 and 320 are deenergized, and the line pressure of the oil passage 102 engages a clutch 12 through oil passages 117 and 118. When the manual valve is manually shifted to the position D, at the first speed, oil pressure is supplied to a clutch 24 and the pressure hold valve 360 through the oil passage 104 and the pressure suitable for smoothly engaging the clutch 24 is held for a predetermined time until the pressure accumulates in an oil chamber 363. At a 1-2 speed shift, a solenoid valve 300 performs make-and-break operation at the appointed period for a predetermined time, for example, two seconds and oil pressure in the oil chamber 263 changes as shown in FIG. 4; the oil pressure which was regulated in the first oil pressure regulating chamber 264 in accordance with this change in oil pressure, engages a brake 26 through oil passages 111, 114, a flow control valve 340 of the present invention, and oil passages 115, 116. In this case, the supply of regulated oil pressure is performed quickly through both orifice 341 and orifice 342 of the flow control valve 340. Simultaneously with the engagement of the brake 26, pressure accumulation is commenced in the pressure oil accumulating chamber 364 of the pressure hold valve 360 connected to the oil passage 116 and a spool 362 is transferred by a spring 361 and the oil pressure of an oil passage 116 to the right side shown in the figure.

Figure 5:
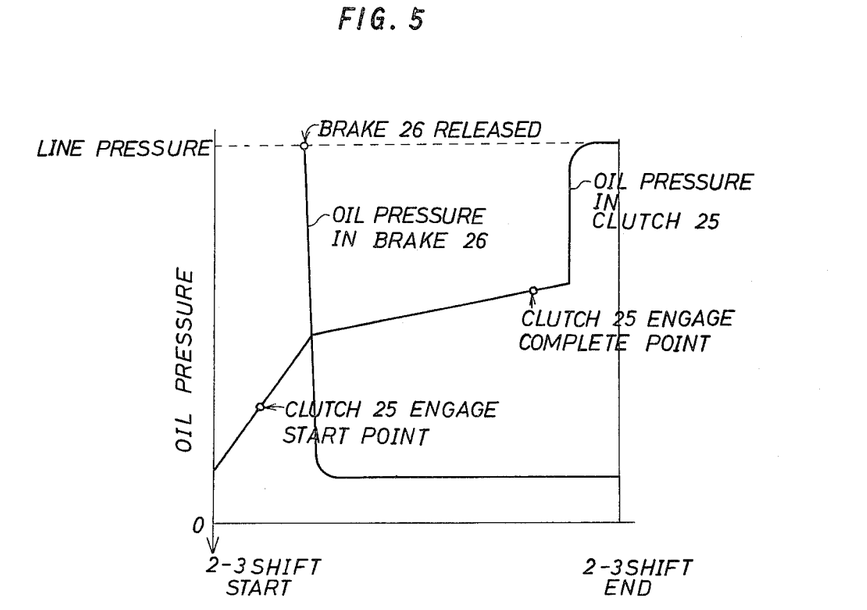
FIG. 5 is a graph showing a change in oil pressure of a hydraulic servo at the hydraulic controller.

At a 2-3 speed shift, the solenoid valve 310 is deenergized, the spool 232 of the 2-3 speed shift valve is transferred to the right side shown in the figure, and the oil passage 111 connects to an oil passage 119 and the oil passage 117. The 2-3 speed shift is the shift from a brake to a clutch without intervention of a one-way clutch. In order to prevent the idling of gears and the shock during the speed shift, the brake 26 is maintained in the engaged condition for a predetermined period of time until the commencement of engagement of a clutch 25. The area of the small orifice 342 of the flow control valve 340, the volume of the regulated oil pressure accumulating chamber 364, the elastic modulus of the spring 361 all contribute to reduce the shock at the speed shift. Thus the disengagement of the brake 26 is delayed by the small orifice 342 of the flow control valve 340, the spring 361 and the oil pressure of the oil passage 104 at the pressure hold valve 360 for an optimum period of time, for example, 0.5 sec; after that the solenoid valve 320 is energized, the spool 222 of the 1-2 speed shift valve is shifted to the right side shown in the figure and the oil passage 116 connects with an oil exhaust port 224. A graph in FIG. 5 shows the change in the oil pressure of each oil pressure servo of a brake 26 and a clutch 25 at the 2-3 speed shift.

At the 2-3 speed shift, the spool 242 of the 2-3 speed shift auxiliary valve 240 is initially set to the left side shown in the figure with the line pressure in the oil passage 102 being supplied to the oil chamber 243. The oil passage 119 engages the clutch 25 through the oil passage 120. Moreover the oil passage 102 engages the clutch 12 through the oil passages 113, 117 and 118 while the spool 252 of the 3-4 speed shift valve 250 is fixed to the left side shown in the figure. The regulated pressure becomes equal to the line pressure when the 2-3 speed shift is completed, and at that time the spool 242 is allowed to travel to the right side shown in the figure due to the oil pressure of the clutch 25 and the action of the spring 241. At that time, oil pressure is supplied to the oil chamber 244 from the oil passage 122 so that the spool 242 is fixed to the right side shown in the figure, the oil passage 119 connects with the oil passage 117 and the oil passage 113 connects with the oil passage 103.

At the 3-4 speed shift, as the solenoid valve 320 is de-energized, a spool 252 of the 3-4 speed shift valve 250 is shifted to the right side shown in the figure, the clutch 12 is disengaged, the oil passage 118 being connected to the oil exhaust port 255. At the same time, the oil passage 123 supplies brake 19 with the regulated oil pressure of the first oil pressure regulating chamber 264 transmitted through the oil passages 117 and 119 thereby smoothly engaging brake 19.

At the 4-3 speed shift, the action is reverse to the above. At the 3-2 speed shift, the solenoid valve 320 is deenergized and the solenoid valve 310 is energized while the oil pressure is regulated by the shift transition control valve 260. When the transmission is shifted down to the 2nd speed stage, the rotations of the engine and the transmission are synchronized. At the 2-1 speed shift, the action is reverse to the 1-2 speed shift.

At the position 3 of the manual valve 210, the shift to the fourth speed stage is obstructed, as the spool 252 of the 3-4 speed shift valve 250 is fixed to the left side shown in the figure by supplying the line pressure to the oil chamber 253 through the oil passages 103 and 113. At the position L of the manual valve 210, the shifts to the 2nd, 3rd and 4th speed stages are prevented, as the spool 232 is fixed to the left side shown in the figure, by supplying the oil pressure of oil passage 105 to the oil chamber 234 of the 2-3 speed shift valve.

At the position R of the manual valve 210, oil pressure does not enter the oil passages 108 and 109 connected to the solenoid valves 300 and 310, because oil pressure is not supplied to the oil passages 104. Moreover, oil pressure enters the oil passage 105 and the 2-3 shift valve 230 is set to the left side shown in the figure. Part of the oil pressure entering the oil passage 107 enters the oil passage 121 through flow control valve 330 and, along with the oil pressure in oil passage 121 from second oil pressure regulating chamber 265 of the shift transition control valve 260, enters the first piston of clutch 25. The other part of the oil pressure in oil passage 107 enters the oil passage 122, and, along with the oil pressure in oil passage 119 from second oil pressure regulating chamber 265, enters oil passage 120 and then the second piston of clutch 25. Thus, clutch 25 is engaged smoothly. In addition to this, the oil passages 102 and 106 are connected to each other, and the brake 27 is engaged before the clutch 25 is engaged.

Figure 3:
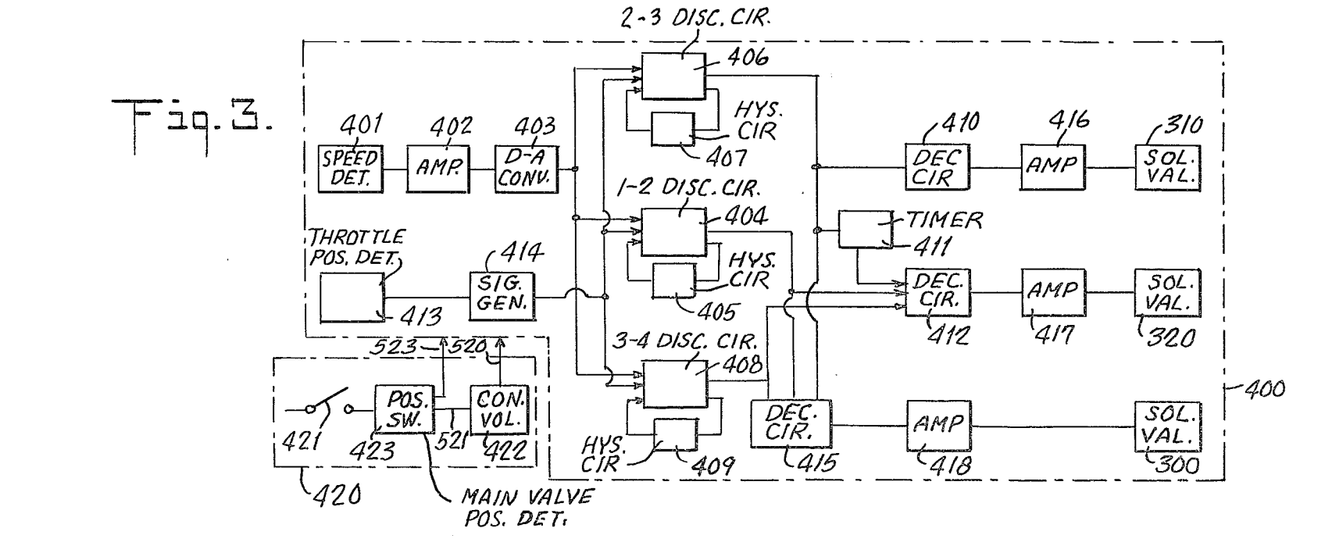
FIG. 3 is a block diagram of an electric controller of the automatic transmission controlling the hydraulic controller in FIG. 2.

Next, an electric control circuit performing the make-and-break operations of the solenoids 300, 310 and 320 shall be described on the basis of one preferred example shown in FIG. 3.

The electric control device is composed of a power unit 420 and a computer circuit 400 which actuates the solenoid valves 300, 310 and 320 according to signals received from a vehicle speed and throttle opening detecting device. The power unit 420 sets the positions of D, 3, 2, and L through a wiring 523 in accordance with a position switch 423 connected to the manual lever. The power unit 420 is connected to a battery through a switch 421, and a constant voltage power supply 422 is connected through wiring 521 to position switch 423. The power unit supplies constant voltage power supply 422 to various components of the computer circuit 400 through wiring 520.

The computer circuit 400 is composed of a vehicle speed detecting device 401, a waveform amplifying and shaping circuit 402, a D-A (Digital-Analog) conversion circuit 403, a throttle position switch 413, a throttle opening voltage generating circuit 414, a 1-2 speed shift discriminating circuit 404, a 2-3 speed shift detecting circuit 406, a 3-4 speed shift discriminating circuit 408, hysteresis circuits 405, 407 and 409, a decision circuit 410 for the make-and-break operation of solenoid valve 310, a timer 411, a decision circuit 412 for the make-and-break operation of solenoid valve 320, a decision circuit 415 for the make-and-break operation of solenoid valve 300, waveform amplifiers 416, 417 and 418, and solenoid valves 300, 310 and 320. The vehicle speed detected by the vehicle speed detecting device 401 is converted into a sinusoidal waveform signal, which is further shaped and amplified by the waveform amplifying and shaping circuit 402 to form rectangular wave signals. The signals are converted into positive DC voltage signals in accordance with the vehicle speed by the D-A conversion circuit 403. The throttle position switch 413 that detects the engine load is composed of a variable resistor whose resistance varies according to the throttle opening. The signal generated in accordance with the throttle opening is converted into DC voltage by the throttle opening voltage generating circuit 414. The first voltage representing the vehicle speed and the second voltage representing the throttle opening enter the 1-2 speed shift detecting circuit 404, the 2-3 speed shift detecting circuit 406, and the 3-4 speed shift detecting circuit 408, respectively. Each of these detecting circuits compares the vehicle speed voltage signal with the throttle opening signal in a comparing circuit such as a differential amplifying circuit to determine the condition for 1-2, 2-3, and 3-4 shifting.

Hysteresis circuits 405, 407 and 409 give conditions for effecting 2-1, 3-2, and 4-3 downshifting, respectively. They prevent hunting in a speed range of gear shifting by effecting downshifting at a speed slightly lower than the respective gear upshifting. The decision circuit 410 outputs on-off signals through amplifier 416 to open or close solenoid valve 310 in response to the output of the 2-3 speed shift discriminating circuit 406. The decision circuit 412 outputs on-off signals through amplifier 417 to open or close the solenoid valve 320 in response to the output of the 1-2 speed shift discriminating circuit 404 and the 3-4 speed shift discriminating circuit 408, and the output of the 2-3 speed shift discriminating circuit 406 through the delay circuit 411. The decision circuit 415 for regulating the pressure pattern outputs on-off signals at the appointed time through amplifier 418 for operating the pressure regulating solenoid valve 300 by sending the appointed pulse for a constant period until shift completion in response to the output of the 1-2, 2-3, and 3-4 speed shift discriminating circuits.

Since oil pressure regulation for the purpose of preventing against shock is performed in separate regulating chambers 265 and 264 for the forward drive and the rearward drive, and the oil pressure is transmitted at the forward drive and the rearward drives in separate oil passages, shocks due to valve sticking and causing overlapping of gear engagement and other malfunctions of the oil circuit can easily be prevented. Moreover, oil pressure regulation can be performed more precisely at the forward drive and the preventive effect against shock is increased by having the second hydraulic oil chamber 267 feed back oil pressure to the first pressure regulating chamber 264.

Maintaining the oil pressure of an oil pressure servo to be exhausted for the appointed time during shifting by the pressure hold valve 360 and the flow control valve 340 prevents idling of gears, and makes the shift smoother.

Figure 6:
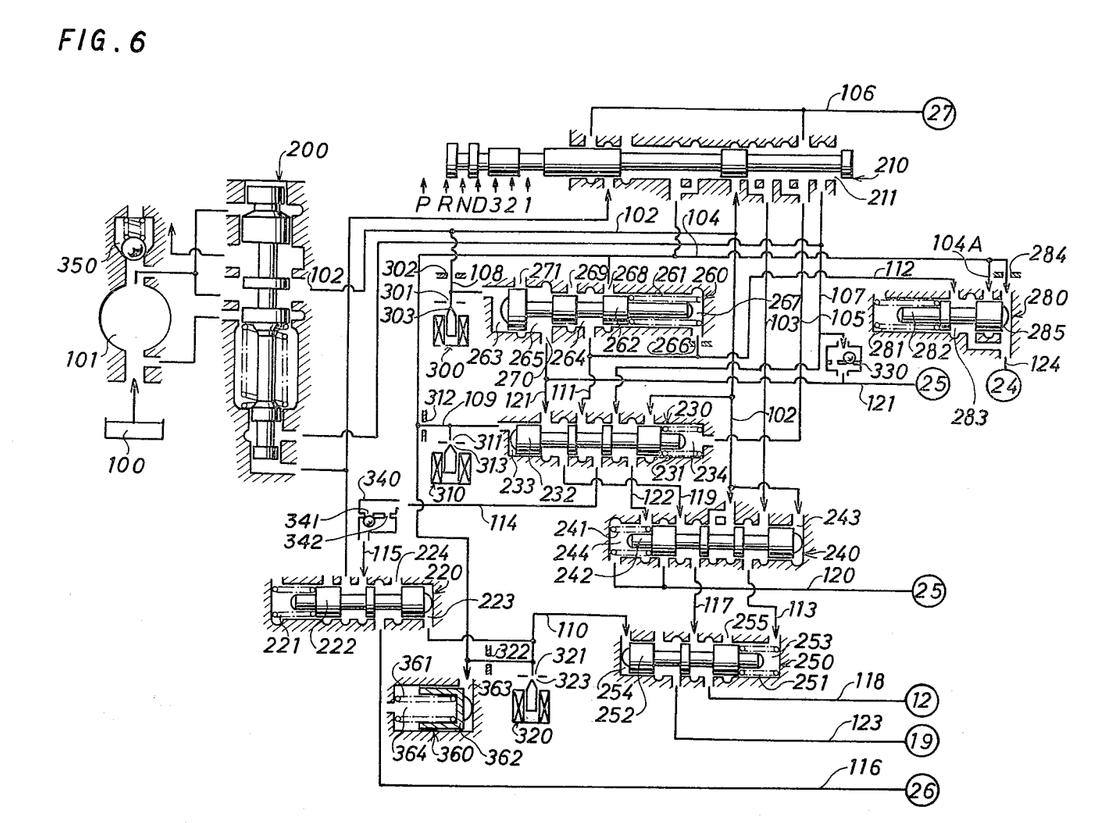
FIG. 6 is an oil pressure circuit diagram of a hydraulic controller showing another embodiment.

FIG. 6 shows the oil pressure circuit of an oil pressure controller showing another preferred embodiment.

In this oil pressure controller, a N-D speed shift auxiliary valve 280 and an oil passage connecting said valve with other valves are added to the oil pressure control device shown in FIG. 2.

The N-D shift control valve 280 is connected to oil passage 104. Valve 280 has a spool 282 behind which a spring 281 is installed on one side of the valve, an oil chamber 283 connected to an oil passage 112 branching from an oil passage 111, and an orifice 284. The valve 280 also has a hydraulic chamber 285 directly connected with the oil passage 104 through an oil passage 104A when the spool 282 is set on left side shown in the figure. The oil chambers 283 and 285 are connected to the servo of a clutch 24 through an oil passage 124. The spool 282 is set on the right shown in the figure when the manual valve 210 is at the position N, and is set on the left side shown in the figure when the valve 210 is at the position D.

At the position N of the manual valve 210, solenoid valves 300, 310 and 320 are deenergized, and the line pressure of the oil passage engages the clutch 12 through the oil passages 117 and 118. When the valve 210 is manually shifted to the position D, oil pressure is supplied to the clutch 24 and the accumulator 360 through the oil passage 104 at the first speed stage, and the accumulator holds the pressure suitable for the smooth engagement of the clutch 24 for a constant period until the accumulation of pressure in the oil chamber 363 is completed. In addition to this, the oil passage 104 and the clutch 24 are connected to each other through the orifice 284, the N-D shift control valve 280 and the oil passage 124, and at the same time, they are connected to the shift transition control valve 260 and the oil passage 111 through the N-D shift control valve 280 and the oil passage 124.

The sequence by which the oil pressure of the oil passage 104 is supplied to the clutch 24 is as follows.

Initially, the oil pressure which was regulated by the shift transition control valve 260 according to the oil pressure pattern shown in FIG. 4 is supplied to the clutch 24 through the oil passages 111 and 112, the oil chamber 283 of the N-D shift control valve 280 and the oil passage 124. Clutch 24 engages smoothly in such a way that the shock due to the shift is prevented. During this period, the oil pressure in hydraulic oil chamber 285 of the N-D shift control valve 280 connected to the oil passage 104 through the oil passage 124 and the orifice 284, is gradually increased and the spool 282 is moved to the left side shown in the figure; the spool 282 cuts off the connection between the oil passages 112 and 124 after completion of the engagement of the clutch 24 and, at the same time, connects the oil passage 104A with 124.

Thus the line pressure is supplied to the clutch 24 and this condition is maintained while the manual valve 210 is at the position D.

The control device of this automatic transmission is equipped with one pressure regulating solenoid valve 300, the shift transition control valve 260 adjusting the oil pressure pattern regulated by said pressure regulating solenoid valve and speed shift control valves 240 and 280 where oil pressure transmitted by said shift transition control valve is supplied to the appointed oil pressure servo during the time from the start of shift to the completion of shift. At that time oil pressure supplied to the oil pressure servo becomes the line pressure. Since the oil pressure regulated by the valve 260 is supplied to an oil pressure servo required to perform the next shift after the previous shift is completed, one pressure regulating solenoid valve is sufficient, and the oil pressure circuit and electric control circuit of the present invention are relatively simple.

In addition to this, the present invention may be utilized as the control device for an automatic transmission having three forward drives or other electronic control systems, besides the automatic transmission having four forward drives of the above-mentioned preferred example. It is also obvious that the maintenance of oil pressure for a constant period by a pressure hold valve and a flow control valve is applicable without limit to the 1-2 speed shift or the 2-3 speed shift where some friction elements are being engaged while others are being disengaged in addition to the case where the above maintenance of oil pressure is performed at the 2-3 speed shift.

We claim:

1. A shift control device for a vehicle with an automatic transmission having a gear system provided with a plurality of friction engaging means for selecting a plurality of forward drive gear ratios and a reverse drive gear ratio in accordance with vehicle running conditions, comprising:
    an electric control circuit comprising signal generating means for generating an electric signal in accordance with the vehicle running condition and a logic circuit for receiving said electric signal and generating an electric output signal corresponding to one of the gear ratios; and
    a hydraulic pressure control system comprising:
        a source of line pressure;
        hydraulic servo means to operate said plurality of friction engaging means;
        a shift transition control valve operable between first and second end positions and all positions therebetween, said shift transition control valve having an oil chamber to receive line pressure and to transmit an adjusted hydraulic pressure through a fluid passage to operate said hydraulic servo means, said adjusted hydraulic pressure depending on the position of said shift transition control valve; and
        a solenoid valve to control the position of said shift transition control valve by supplying and exhausting hydraulic pressure in a second fluid passage connected to said shift transition control valve in response to the electric output signal of said electric control circuit.

2. The shift control device of claim 1 wherein said shift transition control valve has a first oil chamber to receive line pressure and to transmit an adjusted hydraulic pressure to said hydraulic servo means when said vehicle is in a forward drive gear ratio and a second oil chamber to receive line pressure and to transmit an adjusted hydraulic pressure to said hydraulic servo means when said vehicle is in a reverse drive gear ratio.

3. The shift control device of claim 2 wherein said shift transition control valve further comprises a third oil chamber to receive the adjusted hydraulic pressure transmitted by said first oil chamber, and wherein the position of said shift transition control valve is controlled by the balance between the hydraulic pressure supplied by said solenoid valve and the adjusted hydraulic pressure in said third oil chamber.

4. The shift control device of claim 3 wherein said shift transition control valve further comprises biasing means to bias said shift transition control valve against the hydraulic pressure supplied by said solenoid valve.

5. The shift control device of claim 1 or 2 further comprising:
a shift control valve operable between first and second positions and in fluid communication with said shift transition control valve, said shift control valve transmitting the adjusted hydraulic pressure to hydraulic servo means corresponding to a selected gear ratio when in the first position, and transmitting the adjusted hydraulic pressure to a hydraulic servo means corresponding to the next gear ratio when in the second position, and
a second solenoid valve to control the position of said shift control valve in response to the electric output signal of said electric control circuit.

6. The shift control device of claim 5 further comprising:
an auxiliary shift control valve operable between first and second positions and in fluid communication with said shift transition control valve and with line pressure, said auxiliary shift control valve transmitting the adjusted hydraulic pressure to a hydraulic servo means corresponding to a selected gear ratio when in the first position, and transmitting the adjusted hydraulic pressure to hydraulic servo means corresponding to the next gear ratio when in the second position, the position of said auxiliary shift control valve determined by the balance between the adjusted hydraulic pressure and line pressure.

7. The shift control device of claim 5 further comprising:
a N-D shift control valve for engaging hydraulic servo means corresponding to the first forward drive gear ratio when the vehicle is shifted from neutral into forward drive, said N-D shift control valve operable between first and second positions and in fluid communication with said shift transition control valve and with line pressure, said N-D shift control valve transmitting the adjusted hydraulic pressure when in the first position and transmitting line pressure when in the second position to the hydraulic servo means corresponding to the first forward drive gear ratio, the position of said N-D shift control valve determined by the balance between the adjusted hydraulic pressure and line pressure.

* * * * *